United States Patent
Lecerf

(10) Patent No.: US 7,039,900 B2
(45) Date of Patent: May 2, 2006

(54) METHOD FOR IMPLEMENTING A PLURALITY OF OBJECT INTERFACES

(75) Inventor: Guy Lecerf, Les Clayes Sous Bois (FR)

(73) Assignee: Bull, S.A., Louveciennes (FR)

( * ) Notice: Subject to any disclaimer, the term of this patent is extended or adjusted under 35 U.S.C. 154(b) by 644 days.

(21) Appl. No.: 10/157,498

(22) Filed: May 30, 2002

(65) Prior Publication Data

US 2003/0018833 A1    Jan. 23, 2003

(30) Foreign Application Priority Data

May 30, 2001   (FR)   ................................. 01 07025

(51) Int. Cl.
G06F 9/44 (2006.01)
(52) U.S. Cl. ..................... 717/116; 719/328
(58) Field of Classification Search ........ 717/103–109, 717/114, 116–117, 164–166; 719/328
See application file for complete search history.

(56) References Cited

U.S. PATENT DOCUMENTS

| | | | | |
|---|---|---|---|---|
| 5,699,310 | A * | 12/1997 | Garloff et al. | 717/108 |
| 5,978,582 | A * | 11/1999 | McDonald et al. | 717/104 |
| 6,023,578 | A * | 2/2000 | Birsan et al. | 717/105 |
| 6,023,579 | A * | 2/2000 | Hellgren et al. | 717/108 |
| 6,430,740 | B1 * | 8/2002 | Hart et al. | 717/108 |
| 6,480,856 | B1 * | 11/2002 | McDonald et al. | 707/100 |
| 6,615,405 | B1 * | 9/2003 | Goldman et al. | 717/174 |
| 6,721,942 | B1 * | 4/2004 | Sievert | 717/137 |
| 2002/0174420 | A1 * | 11/2002 | Kumar | 717/174 |

FOREIGN PATENT DOCUMENTS

EP    0 702 291 A    3/1996

OTHER PUBLICATIONS

Lamb, "ACM Transactions on Programming Languages and Systems (TOPLAS)", vol. 9 Issue 3. pp. 297-318.*
Jean Bezivin, "From Object Composition to Model Transformation with the MDA", Aug. 2001, TOOS's USA, Volume IEEE TOOLS-39.(5 pages).*

(Continued)

*Primary Examiner*—Tuan Dam
*Assistant Examiner*—Kim-Anh D. Du
(74) *Attorney, Agent, or Firm*—Miles & Stockbridge P.C.; Edward J. Kondracki

(57) ABSTRACT

A method is disclosed for creating a plurality of interfaces for objects or collections of objects of the COM ("Component Object Model") type, in a computer system having at least a processor and a storage device. The method stores a description of each object interface in an interface description language, stores a model class written in an object-oriented language, the model class being an implementation of a corresponding generic interface that identifies all methods associated with the object interfaces described in the interface description language, and stores for each object interface a class, written in an object-oriented language, that inherits from the model class and that corresponds to the implementation of the methods associated with the object interface.

18 Claims, 2 Drawing Sheets

OTHER PUBLICATIONS

Ares Lagae, "Building generic user interfaces", [Online] [Retrieved from] <http://groups.google.com/group/comp.software.patterns>, Mar. 12, 2003, Google Groups: comp.software.patterns. (3 pages).*

Harold Kosch Advance Distributed Design Patterns with Java RMI—RMI and Inheritance; Internet Doc. On-Line May 2, 2001, XP002192575, entire document, URL.:http://www.itec.uni-klu.ac.at/(harald/ds2001/rmi/pattern/pattern2.html.

Christophe Warland Internet Document "On Line" May 1997, XP002193199 URL.:http://www.bejug.org/new/pages/articles/corba/node59.htm, entire document1.

Christophe Warland, "Presentation" Internet Document "On Line" May 1997 XP002193200, URL.:http://www.bejug.org/new/pages/articles/corba/node68.html, entire document.

Jean-Marc Jezequel, Jean-Lin Pacherie: "Parallel Operators" ECOOP, Dur. Conf. on Object Oriented Programing, XX, XX No. 1003, 1996, pp. 1-22, XP000884231, entire document.

Jean-Lin Pacheried, Doctorate Thesis, Dec. 18, 1997, XP002191179, Rennes France, p. 30, par. 2.2-p. 46; p. 75, line 1, par. 3.4—p. 136.

* cited by examiner

METHOD FOR IMPLEMENTING A PLURALITY OF OBJECT INTERFACES

FIELD OF THE INVENTION

The present invention concerns a method for implementing a plurality of object interfaces, these objects being primarily program components of the COM ("Component Object Model") type developed by Microsoft. The method is used primarily when designing a computer systems management program based on a hierarchy of objects organized into object collections, particularly in order to create or modify these object collections, these collections themselves being objects in the COM sense.

BACKGROUND OF THE INVENTION

COM technology allows software components to communicate with one another no matter what machine each component is installed in from the moment these machines are connected to the same communication network. Consequently, COM technology is well adapted for designing, for example, an application of the distributed management platform type in an open system. The following works define the operating principles of COM technology.
  ATL COM Programmer's Reference
  Richard Grimes (Wrox Press, 1999)
  Inside COM+
  Guy & Henry Eddon (Microsoft Press, 2000)
  Essential COM
  Don Box (Addison-Wesley, 1998)
  Professional ATL COM Programming
  Richard Grimes (Wrox Press, 1998)
  ATL Internals
  Brent Rector & Chris Sells (Addison-Wesley, 1999)

To make it possible to manipulate COM components, the designer of the application describes a COM interface for each component. An interface constitutes the public part of an object, which means that the interface provides a user or client with functionalities, known as methods, for manipulating objects, some of which methods can be called properties. However, the interface merely presents the methods; it does not make it possible to execute these methods. In order to execute the methods, the designer develops, in an object-oriented programming language, for example the C++ language, a program that implements the methods displayed by each interface.

In an application, it is possible for a plurality of interfaces to use the same methods. Consequently, it is advantageous to describe, in an interface description language, a so-called generic interface that displays all the methods of these interfaces. Thus, through a simple inheritance relation with this generic interface, the other interfaces can be described simply by unambiguously defining the types of objects to which the particular interface applies.

In order to implement such a generic interface in the C++ language, one need only describe a template class, which has as parameters, among other things, the types of objects to which the interface applies.

However, in interface description languages, it is not possible to associate, as an implementation class of an interface, a model class. Consequently, it is necessary, during the implementation in the C++ language, to describe all the methods of the interfaces. Thus, it is necessary to write the common methods into all of the implementation classes of the interfaces. This method is tedious, and is therefore a source of errors. Moreover, if it is necessary to make corrections in the description of one or more common methods, the designer must repeat the correction or corrections in all of the implementation classes.

Hence, the object of the present invention is to eliminate the drawbacks of the prior art by offering a method for implementing a plurality of object interfaces, making it possible to limit both the volume and the redundancy of the implementation code of the interfaces and to simplify the maintenance, especially the corrections, of the implementation code of the interfaces.

SUMMARY OF THE INVENTION

This object is achieved through a method for implementing, in a computer system that includes at least a processor and storage means, a plurality of interfaces for objects, these objects being objects of the COM ("Component Object Model") type or collections of these objects, and contained in said storage means, characterized in that it comprises:
  a step for storing in a file a description of each object interface in an interface description language (IDL),
  a step for storing in a file a description in an object-oriented programming language of a model class, this class corresponding to the implementation of a so-called generic interface that displays all the methods of the object interfaces described in the interface description language,
  a step for storing for each object interface in a file of the description, in an object-oriented programming language, a class that inherits from the model class and that corresponds to the implementation of the object interface.

According to one characteristic, the method is characterized in that it comprises:
  a step for storing in a file a description in the interface description language of the generic object interface,
  a step for storing in a file the description of each object interface, which consists of establishing an inheritance relation with the generic object interface in the interface description language.

According to another characteristic, the method is characterized in that the step for storing in a file a description of the generic object interface, in the interface description language, comprises a description of a first generic interface corresponding to an object collection of variable size, and a description of a second generic interface corresponding to an object collection of fixed size.

According to another characteristic, the method is characterized in that the interface description language is the "Interface Definition Language" (IDL).

According to another characteristic, the method is characterized in that the object-oriented programming language is the C++ language.

According to another characteristic, the method is characterized in that each object interface is an object collection interface that displays all of the methods for managing a collection.

The corollary subjects of the invention are the computer system for implementing the method of the invention and the corresponding computer program.

The invention, along with its characteristics and advantages, will emerge more clearly through the reading of the description of an exemplary embodiment given in reference to the attached drawings, in which:

DETAILED DESCRIPTION OF THE INVENTION

Figure 1:
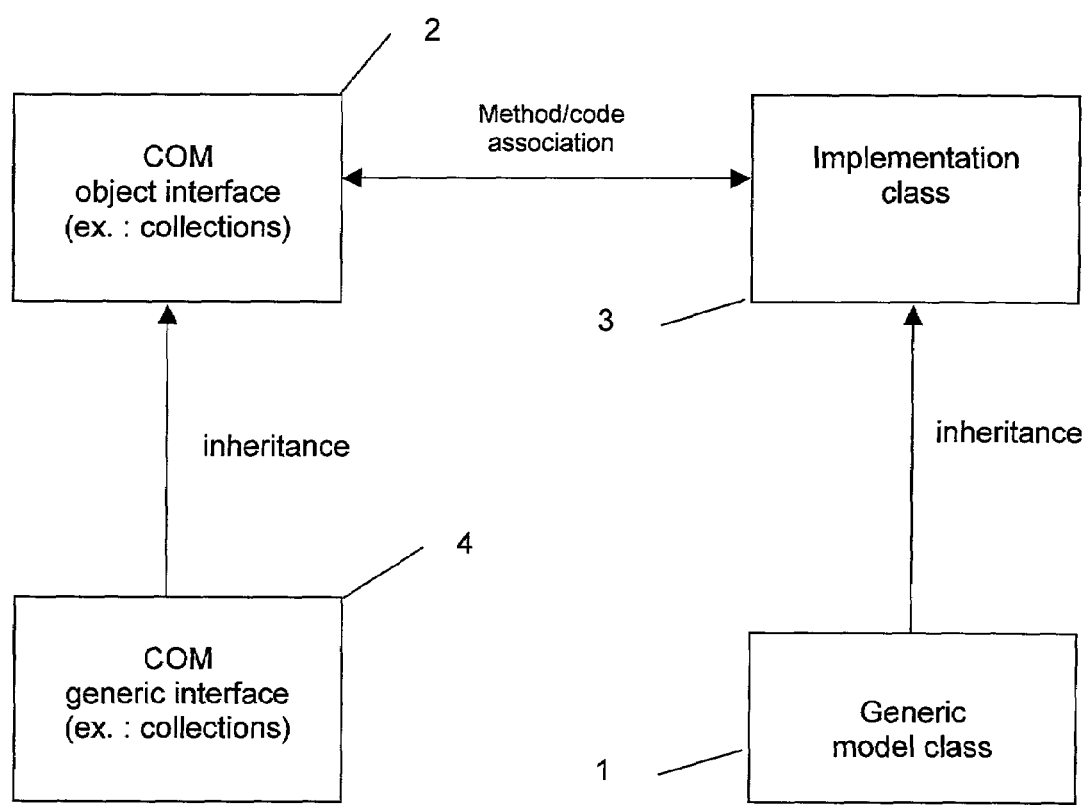
FIG. 1 represents a diagram of the links existing between COM object interfaces and their respective implementation class.

In order to better understand the invention, it is useful to review the context of the invention. First of all, a COM object or component is a distributed software component. As explained above, COM technology allows two COM-type objects to communicate with one another no matter what platform each component is installed in, as long as these platforms are connected to the same network.

A COM object interface is actually a set of functionalities that are accessible by clients. The term clients is meant to include applications such as Visual Basic (sold by Microsoft), Visual Basic scripts, and "Internet"-type pages. The interface presents or displays to these clients the functionalities that the corresponding COM object performs. Likewise, in its implementation, an interface makes this same COM object perform the operations corresponding to the functionality called by the client. The internal execution mode of the functionalities of the COM object interface is not visible to the client.

The implementation of the interface must allow the execution of all of the functionalities displayed by the interface. The description of the functionalities of an interface is produced by means of an interface description language, for example the language IDL ("Interface Definition Language").

As a general rule, the language chosen for the implementation of an interface is an object-oriented language, like the C++ language.

In the context of the invention, it is assumed that a plurality of interfaces present the same set of functionalities for all of the interfaces. However, this set of functionalities may apply to objects of entirely different types.

In the C++ language, there are known model classes, commonly called "templates," that make it possible to generate one or more functions in the same way but on objects of different types. Thus, a single model class makes it possible, by choosing a given object type as a parameter of this function, to perform the function of this class for the object type specified. The use of a model class therefore makes it possible to reduce the volume of code for executing the same functionality for different object types.

However, by construction, the interface description language IDL does not make it possible to associate an implementation class of the model class type with an interface. In other words, the co-class of an interface cannot be a model class ("template").

Moreover, it is known that object-oriented programming languages, and more particularly the C++ language, provide an inheritance mechanism. This mechanism allows a given class to reproduce the functionalities of another class that it inherits.

The principle of the method according to the invention consists of having the implementation class of a particular interface in a plurality of interfaces inherit from a model class, this model class describing the functionalities of a plurality of interfaces. In essence, in this configuration, the implementation class of the particular interface is not a model class ("template"), but merely inherits from a model class.

FIG. 1 summarizes the mechanism of the method according to the invention. First of all, the designer of an application based on the use of a plurality of interfaces constructs a so-called generic model class (1) that makes it possible to perform the functionality or functionalities common to all of the particular interfaces. In other words, if all of the particular interfaces display the same functionality or functionalities, even though they apply to objects of very different types, the model class created by the designer will describe this functionality or functionalities. Thus, during the implementation of a particular interface (2), the declaration of the inheritance from the model class consists of specifically declaring, in the implementation class (3) of the particular interface, as a parameter of the model class, the type of the object or objects to which the functionalities of the particular interface (2) apply.

In another variant of embodiment, the designer defines a so-called generic interface (4) that displays all the functionalities of the particular interfaces comprising the same set of functionalities. Thus, the definition of each particular interface consists of having the particular interface inherit from the generic interface. In other words, the definition of a particular interface is limited to the declaration of inheritance from the generic interface.

Figure 2:
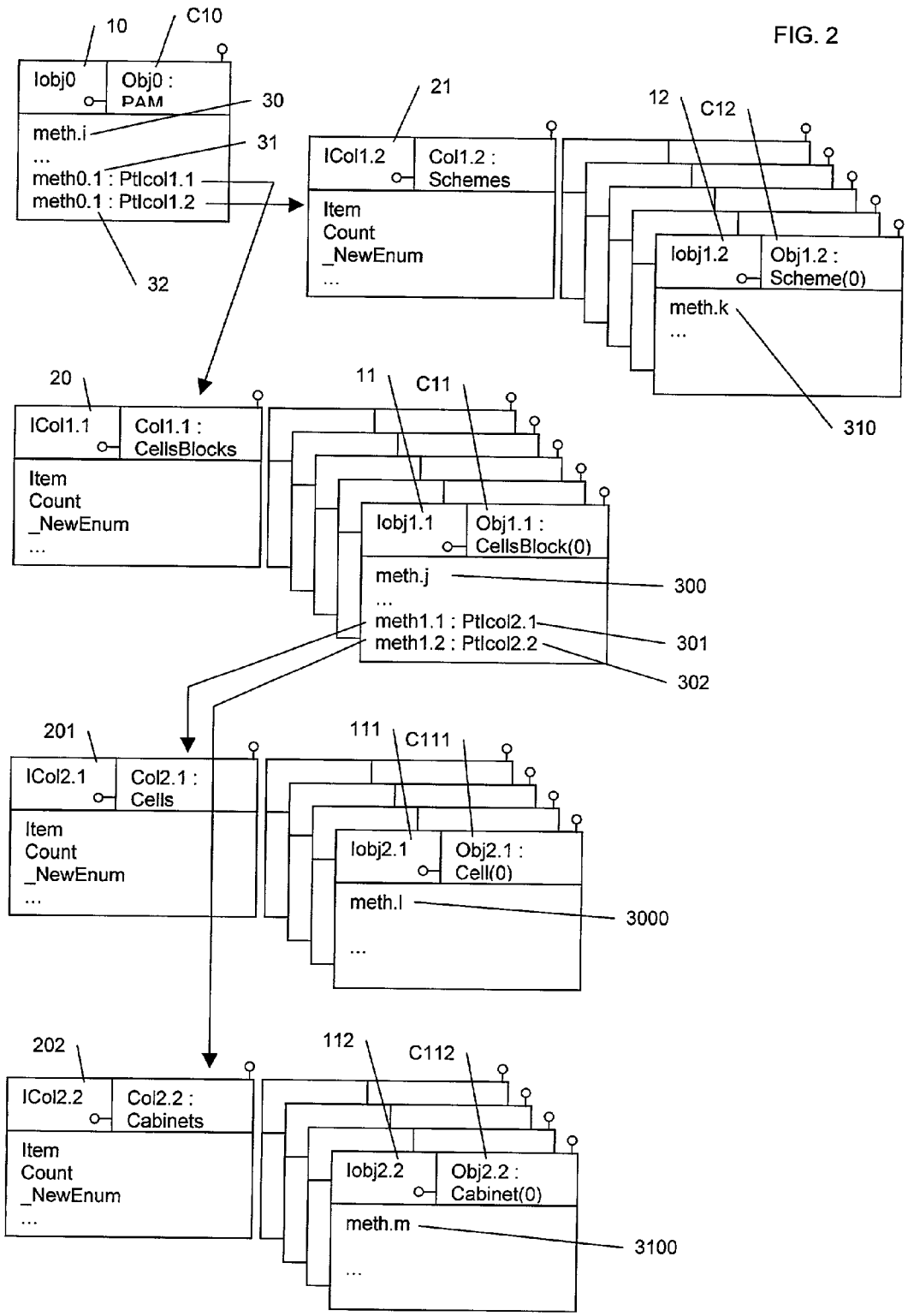
FIG. 2 represents the hierarchical structure of COM components of a computer system management program using the method according to the invention.

In order to provide a better understanding of the method according to the invention, an exemplary utilization of the method for a computer system management program based on a hierarchy of objects organized into object collections will now be described, each object being constituted by a component in the COM sense, and these collections themselves constituting objects in the COM sense. The object hierarchy is represented in FIG. 2.

In this example, each software object in the COM sense (C10, C11, C12, C111, C112) in the structure corresponds in our example to a hardware component that a management platform can manage using the management program. This means that for each hardware component, a software object (C10, C11, C12, C111, C112) contains or manages its own specific hardware characteristics, such as the serial number, the temperature, and the number, nature and identification of the subcomponents.

Each object in the software structure is identified in a unique way and is accessible through object collection interfaces Icol*.* (20, 21, 201, 202) and collected object interfaces Iobj*.* (10, 11, 12, 111, 112). Each object collection includes a given fixed number of objects or a variable number of objects.

A collection interface in the COM sense is an interface that must always present the same set of functionalities, or methods, required for manipulating the objects of the collection. Some of these methods are mandatory, for example "_NewEnum", "Count", "Item", and others are optional, for example "Add", "Remove", "Clear".

"_NewEnum": this method allows an iteration of the objects of the collection.

"Count": this method is a property that returns the number of objects in the collection.

"Item": this method is a property that returns the value of the object indicated if the object exists, or a specific return code if the object does not exist.

"Add": this method adds the specified object to the collection.

"Remove": this method removes the specified object from the collection.

"Clear": this method removes all of the objects from the collection.

In our example, all of the methods mentioned above are displayed in each collection interface Icol*.* (20, 21, 201, 202). Consequently, the method according to the invention can be applied to the collection interfaces Icol*.* (20, 21, 201, 202) because each collection is itself an object in the COM sense.

The collected object interfaces Iobj*.* (10, 11, 12, 111, 112) are interfaces that display methods (30–32, 300–302, 310, 3000, 3100) that make it possible to manipulate the corresponding objects. In fact, the methods of these collected object interfaces Iobj*.* (10, 11, 12, 111, 112) are specifically used to learn or to modify the status of a particular COM object (C10, C11, C12, C111, C112). A collected object interface corresponds to each object in a collection. The various collected objects in the same collection are therefore numbered in increasing order beginning at 0, so that it is possible to access the desired object among the objects in a collection and its interface.

These collected object interfaces Iobj*.* (10, 11, 12, 111, 112), called object interfaces in the context of our example, are not directly involved in the method according to the invention. In essence, each object is manipulated differently depending on its type; consequently, the methods displayed in the object interfaces Iobj*.* are different from one object to another. Among the methods displayed by the object interfaces Iobj*.*, there may be at least one specific method (31, 32, 301, 302) called a collection pointer. This collection pointer actually makes it possible to access the collection interface that corresponds to the lower-level objects in the hierarchy.

Thus, the interface Iobj0 (10) of the parent object (C10), i.e., the entry point of the structure, displays methods that include two collection pointers (31, 32) PtIcol1.1 and PtIcol1.2, for accessing, respectively, a first collection interface (20) Icol1.1 and a second collection interface (21) Icol1.2. Likewise, the collected object interface Iobj1.1 (11) corresponding to the first collection interface (20) Icol1.1 includes two acollection pointers (301, 302) PtIcol2.1, PtIcol2.2 for accessing, respectively, a first collection interface (201) Icol2.1 and a second collection interface (202) Icol2.2.

Thus, as explained above, the method according to the invention can be applied to the implementation of the object collection interfaces Icol*.* (20, 21, 201, 202), since the latter always display the same set of methods. In a first step, the designer of the management program describes using the interface description language (IDL) each object collection interface Icol*.* (20, 21, 201, 202). As explained above, these object collection interfaces Icol*.* (20, 21, 201, 202) always display the same methods. The descriptions of these object collection interfaces Icol*.* (20, 21, 201, 202) are therefore always more or less the same. The difference lies in the fact that the number of objects in the collection is either fixed or variable. Consequently, to avoid duplicating the code in order to describe each interface, the designer describes a first so-called generic interface corresponding to an object collection of variable size and a second so-called generic interface corresponding to an object collection of fixed size.

Let IDynCollection be the name of the first generic interface corresponding to an object collection of variable size. The description of this interface in IDL language is of the following type:

```
interface IDynCollection:IDispatch {
[propget, id(DISPID_VALUE), helpstring("Given an index, returns an item in the
collection")]
    HRESULT Item([in] VARIANT Index, [out, retval] VARIANT *pVal);
[propget, id(DISPID_NEWENUM), helpstring("Returns an enumerator for the
collection"), restricted]
    HRESULT _NewEnum([out, retval] IUnknown **pVal);
[propget, id(1), helpstring("Returns the number of items in the collection")]
    HRESULT Count([out, retval] long *pVal);
[id(2), helpstring("Adds an item to the collection")]
    HRESULT Add([in] VARIANT Name);
[id(3), helpstring("Removes an item from the collection")]
    HRESULT Remove([in] VARIANT Index);
[id(4), helpstring("Clears the collection")]
    HRESULT Clear(void);
};
```

This description begins with a line defining an interface with the name "IDynCollection" as the inheritor of the basic interface "IDispatch".

Each of the methods to be implemented for this interface is then defined by two different lines.

A first line, between brackets "[" and "]" describes certain parameters of the method in question:

"propget" indicates that the method is a property, accessed by reading.

"id(DISPID_VALUE)" indicates that the identification number of the method in this interface is "0". In essence, <<DISPID_VALUE>> is a constant with the value "0" that always identifies this method "Item" specific to the collections. Likewise, <<DISPID_NEWENUM>> is a constant with the value "−4".

"helpstring" defines a text (character string) that serves to explain the method.

A second line defines the name of the method (for example "Item" or "NewEnum") that corresponds to the code "HRESULT" characteristic of COM objects, and defines between parentheses the parameters used by this method:

"Index" is the name of a parameter of the "VARIANT" type used in the incoming direction ("in"), i.e., from the caller (client) to the called (server);

"*pval" is the name of a parameter of the pointer type that points to variables of the "VARIANT" type, used in the outgoing direction ("out") i.e., from the called (server) to the caller (client);

the word "retval" indicates that the value returned by the parameter in question (i.e., *pval) will constitute the value returned by the method at the end of its execution (value returned by the method);

The name "IUnknown" is the name of a basic interface, which must be present in all of the COM objects, and from which all the other interfaces must inherit.

Thus, this description includes an implementation of each of the methods specific to object collections, i.e. "_NewEnum", "Count", "Item", "Add", "Remove" and "Clear".

Let IStaticCollection be the name of the second generic interface corresponding to an object collection of fixed size. The description of this interface in IDL language is of the following type:

```
interface IStaticCollection:IDispatch {
[propget, id(DISPID_VALUE), helpstring("Given an index, returns an item in the
collection")]
        HRESULT Item([in] VARIANT Index, [out, retval] VARIANT *pVal);
[propget, id(DISPID_NEWENUM), helpstring("Returns an enumerator for the
collection"), restricted]
        HRESULT _NewEnum([out, retval] IUnknown **pVal);
[propget, id(1), helpstring("Returns the number of items in the collection")]
        HRESULT Count([out, retval] long *pVal);
[id(2), helpstring("Adds an item to the collection"), restricted]
        HRESULT Add([in] VARIANT Name);
[id(3), helpstring("Removes an item from the collection"), restricted]
        HRESULT Remove([in] VARIANT Index);
[id(4), helpstring("Clears the collection"), restricted]
        HRESULT Clear(void);
};
```

Just as for the first generic interface defined above, this description includes an implementation of each method specific to object collections, i.e., "_NewEnum", "Count", "Item", "Add", "Remove" and "Clear".

The preceding two descriptions differ only in the keyword "restricted" applied to the methods "Add", "Remove", and "Clear". This keyword eliminates access to these methods by certain client applications, but not by C++ clients.

The description of each of the two generic interfaces is stored in a given file in storage means.

Thus, the description of an object collection interface Icol*.* (20, 21, 201, 202) is limited to simply a declaration of inheritance from one of the generic interfaces previously described.

Thus, for an interface for object collections of variable size whose name is ICol1.2, the description is of the following type:
interface ICol1.2: IDynCollection
{ }

Likewise, for an interface for object collections of fixed size whose name is ICol1.1, the description is of the following type:
interface ICol1.1: IStaticCollection
{ };

In another step, the designer describes in a model class in the programming language, for example in the C++ language, the code of a generic collection named, for example, CGeneric.

The parameters of the model class specifically include the name of the collection interface and the type of the collected objects.

For example, the implementation in C++ of the generic collection CGeneric is of the following type:

```
template <class Itf, class Obj> class CGeneric
{
public:
    STDMETHOD(Method1)(...)
    {
        //Implementation of Method 1 using the template <Obj>
        HRESULT hr;
        ...
        return hr;
    }
```

```
    STDMETHOD(Method2)(...)
    {
        //Implementation of Method 2 using the template <Obj>
        HRESULT hr;
        ...
        return hr;
    }
    ...
};
```

The first line of the description includes the name of the model class ("CGeneric") and the parameters of the model class ("class Itf" and "class Obj").

When the model class is used to create an object, the first parameter "class Itf" of the model class will correspond to the name of the object collection interface and the second parameter "class Obj" will correspond to the name of the objects to be collected.

The term "STDMETHOD" invokes the utilization of a macro (an identifier representing an expression written in C++ language) that defines the signature of the method in question. It is followed by the name of the functionality, or method, defined, and by parameters of this method (not specified in the example: "( . . . )").

The subsequent lines (not specified in the example: ". . . ") contain the code that performs the operations executed by the method.

The last line for each method is "return hr;", which indicates the return to the user of the method the parameter "hr", whose value was defined in the preceding code and provides information as to the success of the operations executed by the method. A success is indicated by the value "0", a failure by a negative value.

In this example, and in the case where the class CGeneric corresponds to the implementation of a collection interface, Method 1 and Method 2 correspond to two of the six methods ("_NewEnum", "Count", "Item", "Add", "Remove", "Clear") displayed by a collection interface. The other four methods are implemented in the same model class, in a manner similar to Method 1 and Method 2.

Thus, the class CGeneric provides the implementation of all the methods for managing a collection.

The C++ code of the model class constituting the generic collection is stored in a given file in storage means, for example in the same directory as the description file for the generic interfaces in the IDL language.

In our example, the designer must also describe in the C++ language each object that is an element of a collection. The implementation of an object that is an element of a collection does not pose any particular problem. For example, a class named "Cobj1.1" will constitute the description in C++ language of the implementation of the methods of the collected object interface "Iobj1.1".

Then, in another step, the designer describes, using the C++ language, an implementation class corresponding to each of the object collection interfaces Icol*.* (20, 21, 201, 202).

For example, the implementation class "Ccol1.1." of the object collection interface "Icol1.1" that makes it possible to collect the objects whose implementation class is "Cobj1.1" is of the following type:

```
class Ccol1.1.:public CGeneric<Icol1.1, Cobj1.1>, public . . .
{
public:
    Ccol1.1 ( ) { }
    BEGIN_COM_MAP(Ccol1.1)
    COM_INTERFACE_ENTRY(Icol1.1)
    COM_INTERFACE_ENTRY (IDispatch)
    END_COM_MAP( )
    . . .
};
```

The first line indicates the creation of a class Ccol1.1. by inheritance from the class CGeneric, using the interface Icol1.1 as the interface mentioned in the code that describes this same class CGeneric. The word "public" is a way of specifying the scope of validity of an object in the structure of the program.

The word "BEGIN_COM_MAP" invokes a macro (defined in the ATL software element library) specifying the beginning of the list of interfaces to be associated with the class Ccol1.1.

The word "COM_INTERFACE_ENTRY" invokes a macro (ATL) specifying that the interface between parentheses (in this case Icol1.1 followed by IDispatch) is an interface to be associated with the implementation class Ccol1.1.

The name "IDispatch" is the name of a basic interface from which all the interfaces supporting the client applications that dynamically acquire the information on their methods and properties, must inherit.

The word "END_COM_MAP" invokes a macro (ATL) specifying the end of the list of interfaces to be associated with the class mentioned by the line "BEGIN_COM_MAP".

Thus, it is understood that by inheriting (on the first line) from the model class (CGeneric), the C++ implementation class Ccol1.1 of an object collection interface Icol1.1. benefits from the code of this model class. Consequently, it is no longer necessary to systematically duplicate the code describing all of the methods for managing a collection in each of the implementation classes (Ccol1.1, Ccol1.2, Ccol2.1, Ccol2.2, etc.) corresponding to each of the object collection interfaces (respectively Icol1.1, Icol1.2, Icol2.1, Icol2.2, etc.).

Likewise, when a programming error must be corrected in the description of one or more methods for managing a collection, one need only modify the code of the model class CGeneric in order for this correction to be included in all of the implementation classes of an object collection interface.

It should be clear to those skilled in the art that the present invention allows for embodiments in many other specific forms without going beyond the scope of application of the invention as claimed. Consequently, the present embodiments should be considered as examples, but can be modified within the range defined by the scope of the attached claims, and the invention should not be limited to the details given above.

While this invention has been described in conjunction with specific embodiments thereof, it is evident that many alternatives, modifications and variations will be apparent to those skilled in the art. Accordingly, the preferred embodiments of the invention as set forth herein, are intended to be illustrative, not limiting. Various changes may be made without departing from the true spirit and full scope of the invention as set forth herein and defined in the claims.

I claim:

1. A method for creating a plurality of interfaces for objects or collections of objects of the COM ("Component Object Model") type, in a computer system having at least a processor and a storage device, the method comprising the steps of:
   storing a description of each object interface in an interface description language;
   storing a model class written in an object-oriented language, the model class being an implementation of a corresponding generic interface that identifies all methods associated with the object interfaces described in the interface description language; and
   storing for each object interface a class, written in an object-oriented language, that inherits from the model class and that corresponds to the implementation of the methods associated with the object interface.

2. The method of claim 1, further comprising the steps of:
   storing a description of the generic object interface in an interface description language, and wherein the step of storing the description of each object interface further comprises establishing an inheritance relationship with the generic object interface.

3. The method of claim 2, wherein the step for storing a description of the generic object interface further comprises a description of a first generic interface corresponding to an object collection of variable size, and a description of a second generic interface corresponding to an object collection of fixed size.

4. The method of claim 1 wherein the interface description language is the "Interface Definition Language" (IDL).

5. The method of claim 1, wherein the object-oriented programming language is the C++ language.

6. The method of claim 1, characterized in that each object interface is an object collection interface that identifies all of the methods for managing a collection.

7. The method of claim 2 wherein the interface description language is the "Interface Definition Language" (IDL).

8. The method of claim 2, wherein the object-oriented programming language is the C++ language.

9. The method of claim 2, wherein each object interface is an object collection interface that identifies all of the methods for managing a collection.

10. A computer system for creating a plurality of interfaces for objects or collections of objects of the COM ("Component Object Model") type, the computer system comprising at least one processor, a storage device for
    storing a description of each object interface in an interface description language;

a model class written in an object-oriented programming language, the model class being an implementation of a corresponding generic interface that identifies all methods associated with the object interfaces described in the interface description language; and a class for each object interface, written in an object-oriented programming language, that inherits from the model class and that corresponds to the implementation of the methods associated with the object interface.

11. The computer system of claim 10, wherein the storage device stores a description of the generic object interface in an interface description language, and establishes for each object interface an inheritance relationship with the generic object interface.

12. The computer system of claim 11, wherein the storage device stores a description of a first generic interface corresponding to an object collection of variable size, and a description of a second generic interface corresponding to an object collection of fixed size.

13. The computer system of claim 10 wherein the interface description language is the "Interface Definition Language" (IDL).

14. The computer system of claim 10, wherein the object-oriented programming language is the C++ language.

15. The computer system of claim 10, wherein each object interface is an object collection interface that identifies all of the methods for managing a collection.

16. A computer program comprising program code for creating a plurality of interfaces for objects or collections of objects, said objects being objects of the COM ("Component Object Model") type, on a computer system comprising at least one processor and a storage device, the computer program executing the steps of:

storing in the storage device a description of each object interface in an interface description language;

a model class written in an object-oriented programming language, the model class being an implementation of a corresponding generic interface that identifies all methods associated with the object interfaces described in the interface description language and, for each object interface, a class written in an object-oriented language, that inherits from the model class and that corresponds to the implementation of the methods associated with the object interface.

17. The computer program of claim 16, wherein the program executes the steps of:

storing a description of the generic object interface in an interface description language, and establishing for each object interface an inheritance relationship with the generic object interface.

18. The computer program of claim 17, wherein the program in the step for storing a description of the generic object interface further provides a description of a first generic interface corresponding to an object collection of variable size, and a description of a second generic interface corresponding to an object collection of fixed size.

* * * * *

UNITED STATES PATENT AND TRADEMARK OFFICE
CERTIFICATE OF CORRECTION

PATENT NO.         : 7,039,900 B2
APPLICATION NO. : 10/157498
DATED              : May 2, 2006
INVENTOR(S)        : Guy Lecerf It is certified that error appears in the above-identified patent and that said Letters Patent is hereby corrected as shown below:

Please add the following two claims which were omitted from the patent:
After column 12 line 27

Claim 19—The computer program of Claim 16, wherein the interface description language is an "Interface Definition Languge" (IDL).

Claim 20 - The computer program of claim 16, wherein the object-oriented programming language is a C++ language.

Signed and Sealed this

Nineteenth Day of September, 2006

JON W. DUDAS
*Director of the United States Patent and Trademark Office*